No. 843,357. PATENTED FEB. 5, 1907.
W. A. PARTEE & J. C. WHARTON.
HULL CLEANING AND FRICTION REDUCING APPARATUS.
APPLICATION FILED JAN. 24, 1906.
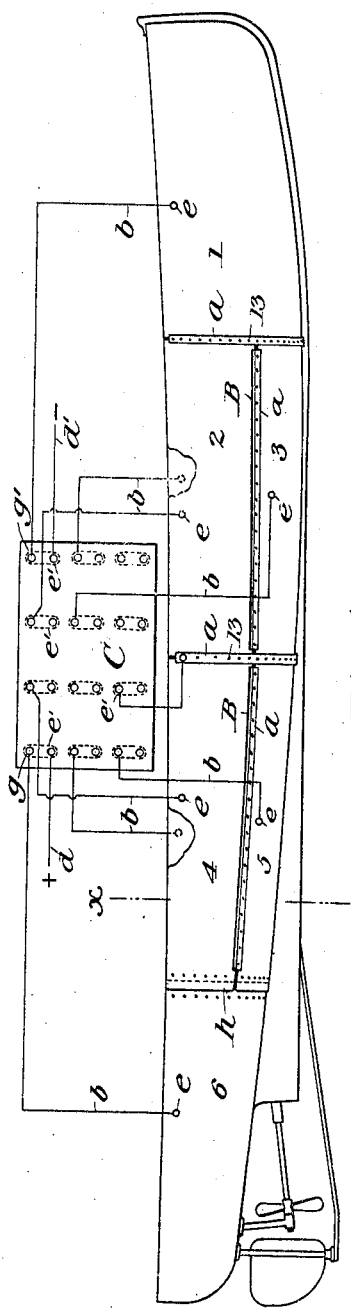
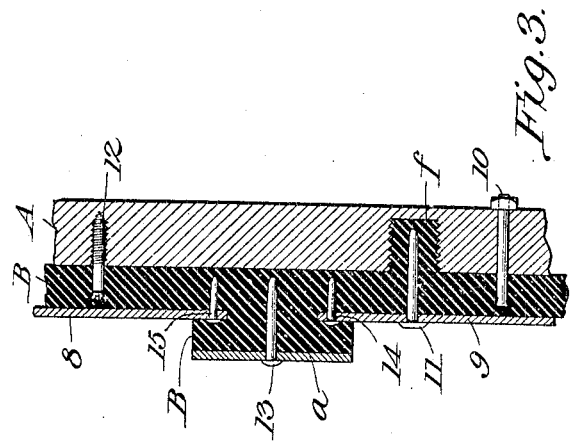
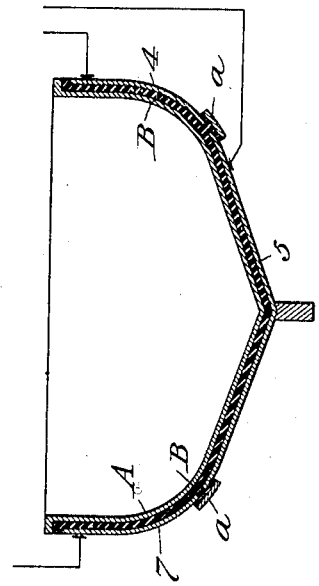
Witnesses:
Inventors,
William Arky Partee.
John Criddle Wharton.

UNITED STATES PATENT OFFICE.

WILLIAM ARKY PARTEE AND JOHN CRIDDLE WHARTON, OF NASHVILLE, TENNESSEE.

HULL-CLEANING AND FRICTION-REDUCING APPARATUS.

No. 843,357.      Specification of Letters Patent.      Patented Feb. 5, 1907.

Application filed January 24, 1906. Serial No. 297,722.

*To all whom it may concern:*

Be it known that we, WILLIAM ARKY PARTEE and JOHN CRIDDLE WHARTON, citizens of the United States, residing at Nashville, in the county of Davidson and State of Tennessee, have invented a new and useful Hull-Cleaning and Friction-Reducing Apparatus, of which the following is a specification.

Our invention relates to improvements in hull-cleaning and friction-reducing apparatus, the object being to clean and keep clean the submerged portion of ships and all watercrafts whatsoever, either in motion or standing still, without having to be raised or docked. We attain this object with the mechanism described below and illustrated by drawing deposited with this application.

Our improvement consists in a sectionalized, insulated, electrified sheathing adapted to be operated in the ordinary medium for floating vessels—namely, water.

The serious retardation to the speed of vessels that is occasioned by hulls being fouled with barnacles, sea-weeds, silt, &c., is too well known to need proof, and the expenses, delays, and troubles of cleaning such hulls by docking the vessels and using the ordinary mechanical methods are items desirable to be lessened or removed as far as can be done.

Our invention is designed to effect the cleaning of hulls without the necessity of docking, and may be operated either while the ship or vessel is stationary or in motion, thus saving the time and expenses of docking. As our improvement is adapted to electrochemical operation the troublesome mechanical methods now in vogue are dispensed with.

Figure 1 is a provisional representation of an entire ship-hull. Fig. 2 is a section of Fig. 1 through the vertical plane in line with *x x* Fig. 1, the scale being somewhat enlarged for better illustration. Fig. 3 is a detail drawing of sections of the hull, insulation, sheathing, &c., on a more enlarged scale than shown in Fig. 2. The relative proportions in the various sections are "exaggerated" for the sake of easy explanations and references.

Similar letters and figures of reference refer to similar parts throughout the several views.

Referring to Fig. 1, the exterior portion of the hull A, as exposed to view, exhibits the sheathing divided into superficial sections 1 2 3 4 5 6. These sections are separated from each other, so far as the metallic (usually copper) sheathing is concerned, and the spaces separating the different sections are covered by electrically-insulated straps *a a a*, &c. The sections of sheathing 1 2 3 4 5 6, &c., are insulated electrically from each other and also from the body of the hull A, to which they are attached. The methods by which the said insulation is accomplished are more clearly set forth in Figs. 2 and 3.

Referring to Fig. 2, A represents the main body of the hull, which may consist of wood or of wood and metal associated together, as is commonly done in the practice of ship-building. If the hull should be made of wood which has been saturated with paraffin, for instance, it is in itself an electrical insulator, and the sheathing—sheet-copper, for instance—can be nailed or screwed to such wooden hull in suitable sections, separated from each other by a sufficient space, care being observed to avoid any "short-circuiting" effect by accidental contacts of nails, screws, bolts, &c., with conducting materials that would electrically unite sections not intended to be so united.

If the hull A is made partly or wholly of metal, then an electrical insulator B is provided to make the proper separation between the hull A and the metallic sheathing 1 2 3 4 5 6, &c., as represented in the drawings, Figs. 2 and 3. The insulation B may consist of paraffined or asphalted, tarred, or creosoted wood, of sheet india-rubber, vulcanized rubber, or a composition of insulating materials—such, for instance, as a mixture of paraffin, asphaltum, chicle, and sand. Such "insulation" may be spread entirely over the exterior surface of the hull A, or it may be spread only upon such surfaces as practically require such insulation. In some cases porcelain, mica, asbestos, or other incombustible insulation may be used, as the case may demand or as may be deemed expedient. Suitable insulation may also be applied to the sheathing on the surface which is to come in contact with the hull, if so desired, or the insulation may be applied to the hull only or to the sheathing only, as shall be considered practically the best way in any case, either for economy or other reason.

The manner of attaching the different parts, as of insulation and sheathing, to the hull is shown in some of its phases in Fig. 3. Referring to Fig. 3, A represents a section of a hull-body and is here considered to be of metal or some electrically-conductive material. B is some form or class of insulation. The said insulation may be secured to the hull-body A by means of screws, pins, or bolts, as represented by numbers 10, 11, and 12. In every such case the said screw, pin, or bolt must be insulated, so that metallic contact between the hull A and the sheathing 8 or 9 or the strap $a$ shall not occur.

Where it becomes expedient, the insulation B may be inserted into the hull-body A by countersinking it, dovetailing it, or threading it in as a screw, as shown at $f$, Fig. 3. The insulation may also extend entirely through the sections both of the hull-body and the sheathing or through either, as may be found to be best in any given case, though these features are not shown in the drawings.

In addition to the insulation shown and described the screws, pins, nails, bolts, &c., may be respectively insulated by enamels, lacquers, japans, &c., to be used independently of other insulation or in conjunction therewith, as may be desired.

The insulated sheathing or the uninsulated sheathing may be fastened to the insulation B, as shown in Fig. 3, by means of nails or screws 11, 14, and 15, while the insulation B is secured to the hull A by screws or bolts 10 12 or other practical methods.

The spaces between the sections of sheathing 1 2 3 4 5 6, &c., may be filled with suitable waterproof insulation and be left uncovered, or, as will in most cases probably be preferable, these spaces may be covered by insulated straps $a\ a\ a$, &c., in order to make more perfectly water-tight joints. These straps $a\ a\ a$, &c., may be fastened to the insulation B, and thus to the hull A, as shown in Fig. 3, by means of nails, screws, &c., driven in the spaces between the sections of sheathing 1 2 3 4 5 6, &c.

In practice the seams or spaces between the sections of sheathing will probably be arranged mostly in a longitudinal direction along the hull, rather than transversely, as offering the least resistance to the speed of the vessel when thus arranged, and the sheathing may also overlap itself, as at $h$, Fig. 1.

The sections of sheathing may be divided into such areas superficially as will allow of the most economical application of electrical power which may be obtained from a source of electricity, as from a dynamo or from a storage battery, &c., neither of which is shown in the drawings.

Permanent or detachable electrodes may be connected to the different sections and carried through suitable ways or channels independently of each other to a convenient switchboard and be so connected to it that the electric current derived from the dynamo or storage battery may be applied to any two or more sections of the sheathing 1 2 3 4 5 6, &c., or straps $a\ a\ a$, &c., that shall be decided upon. In Fig. 1 a diagram indicates a provisional switchboard C, to which electrodes $e\ e\ e$, &c., are attached at $e'\ e'\ e'$, &c., so that the current-bearing electrodes $d\ d'$ coming from the dynamo or storage battery may be connected electrically with the said electrodes $e\ e\ e$, &c., by suitable connections upon a metal plate common to both sets of electrodes, respectively, as shown at $g\ g'$.

In operation the process and results are as follows: The electrodes $d\ d'$ being connected, respectively, to $g\ g'$ with electrodes $e\ e$, leading, respectively, to 6 and 1 of the sections of sheathing and the electric current turned on electrolytic action takes place between the sections of sheathing 6 and 1 through the medium of the water in which the said sections of sheathing are submerged. Decomposition of the electrolyte takes place and the surfaces of the said sheathing are affected in the well-known manner of the anode and cathode, gases being produced on the submerged surfaces. Under these conditions adhering things, such as barnacles, algæ, and other organized structures, silt, &c., are loosened from the surface of the sheathing to which they have adhered and they fall away from it, thus ridding the sheathing of these pests, which act as great retarders of speed and otherwise injuriously to ships or watercrafts of all kinds.

Having thus described our invention, our claims for the same are as follows:

1. In a hull-cleaning, friction-reducing device, the combination of a hull and an insulated sectionalized sheathing and means for passing an electric current from one section to another substantially as described and for the purpose set forth.

2. In a hull-cleaning, friction-reducing device, the combination of a hull and an insulated, sectionalized sheathing, and means for electrifying the same, substantially as shown and for the purpose set forth.

3. In a hull-cleaning, friction-reducing device, the combination of a hull and an insulated, sectionalized sheathing, and means for electrifying the same so as to produce gases on the submerged surfaces, substantially as shown and for the purpose set forth.

4. In a hull-cleaning, friction-reducing device, the combination of a hull and an insulated, sectionalized sheathing, and means for electrifying the same in two or more equal or unequal parts, substantially as shown and for the purpose set forth.

5. In a hull-cleaning, friction-reducing device, the combination with a hull, of an insulated sectionalized sheathing, a switchboard, insulated electrodes connecting separate sections of said sheathing to the switchboard, and other electrodes connecting an electrical generator with the switchboard, whereby separate sections of the sheathing are adapted to receive, independently of each other, electricity from the electrical generator in any predetermined variation, substantially and for the purpose as set forth.

6. In a hull-cleaning, friction-reducing device, the combination of a hull and an insulated, sectionalized sheathing and insulated straps covering the spaces between the sections of said sheathing and means for electrifying the same, substantially as shown and as set forth.

In testimony whereof we have signed our names to this specification in the presence of two subscribing witnesses.

WILLIAM ARKY PARTEE.
JOHN CRIDDLE WHARTON.

Witnesses:
JAS. E. PARTEE,
L. I. PARTEE.